US010793462B2

(12) United States Patent
Buckley et al.

(10) Patent No.: US 10,793,462 B2
(45) Date of Patent: Oct. 6, 2020

(54) APPARATUSES AND METHODS FOR HEATING MOVING GLASS RIBBONS AT SEPARATION LINES AND/OR FOR SEPARATING GLASS SHEETS FROM GLASS RIBBONS

(71) Applicant: Corning Incorporated, Corning, NY (US)

(72) Inventors: Dennis William Buckley, Painted Post, NY (US); Gary Lamont Hively, Addison, NY (US); Michael Albert Joseph, II, Corning, NY (US); Jason Rudolph Koch, Corning, NY (US); Ritesh Satish Lakhkar, Sausalito, CA (US); Mark Thomas Massaro, Murray, KY (US); Robert Richard Quiel, Horseheads, NY (US); Richard Alan Quinn, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 217 days.

(21) Appl. No.: 15/742,234

(22) PCT Filed: Jul. 7, 2016

(86) PCT No.: PCT/US2016/041223
§ 371 (c)(1),
(2) Date: Jan. 5, 2018

(87) PCT Pub. No.: WO2017/007868
PCT Pub. Date: Jan. 12, 2017

(65) Prior Publication Data
US 2018/0194665 A1 Jul. 12, 2018

Related U.S. Application Data

(60) Provisional application No. 62/189,412, filed on Jul. 7, 2015.

(51) Int. Cl.
*C03B 33/02* (2006.01)
*C03B 33/07* (2006.01)
(Continued)

(52) U.S. Cl.
CPC ........ *C03B 33/0215* (2013.01); *C03B 17/061* (2013.01); *C03B 17/064* (2013.01);
(Continued)

(58) Field of Classification Search
CPC . C03B 33/02; C03B 33/0207; C03B 33/0215; C03B 33/07; C03B 33/072;
(Continued)

(56) References Cited

U.S. PATENT DOCUMENTS

| | | | |
|---|---|---|---|
| 1,720,883 A | | 7/1929 | Campbell et al. |
| 1,738,228 A | * | 12/1929 | Campbell et al. .... C03B 33/078 225/2 |

(Continued)

FOREIGN PATENT DOCUMENTS

| | | |
|---|---|---|
| CN | 202415371 U | 9/2012 |
| JP | 2013203631 A | 10/2013 |

(Continued)

OTHER PUBLICATIONS

International Search Report and Written Opinion of the International Searching Authority; PCT/US2016/041223; dated Oct. 17, 2016; 12 Pages; ISA/US Commissioner for Patents.

*Primary Examiner* — Jason L Lazorcik
(74) *Attorney, Agent, or Firm* — Michael A. Hood; Svetlana Z. Short

(57) ABSTRACT

Apparatuses and methods for heating moving continuous glass ribbons at desired lines of separation and/or for separating glass sheets from continuous glass ribbons are disclosed. An apparatus includes a translatable support portion and a heating apparatus coupled to the support portion. The
(Continued)

heating apparatus is configured to contact the continuous glass ribbon across at least a portion of a width of the continuous glass ribbon at the desired line of separation as the support portion moves in a draw direction, thereby preferentially applying heat to a first side of the continuous glass ribbon at the desired line of separation as the continuous glass ribbon moves in the draw direction.

21 Claims, 8 Drawing Sheets

(51) Int. Cl.
 *C03B 33/095* (2006.01)
 *C03B 33/10* (2006.01)
 *C03B 17/06* (2006.01)
 *C03B 33/09* (2006.01)
 *C03B 33/033* (2006.01)

(52) U.S. Cl.
 CPC ............ *C03B 33/076* (2013.01); *C03B 33/09* (2013.01); *C03B 33/095* (2013.01); *C03B 33/105* (2013.01); *C03B 33/033* (2013.01)

(58) Field of Classification Search
 CPC ....... C03B 33/076; C03B 33/09; C03B 33/10; C03B 33/105
 See application file for complete search history.

(56) References Cited

U.S. PATENT DOCUMENTS

| | | | |
|---|---|---|---|
| 1,744,045 A * | 1/1930 | Halbach | C03B 33/0215 65/112 |
| 1,765,814 A * | 6/1930 | Wright | C03B 33/0215 225/93.5 |
| 2,146,373 A | 2/1939 | Keier | |
| 2,169,687 A * | 8/1939 | Fowleral | C03B 33/09 225/93.5 |
| 2,283,251 A * | 5/1942 | Gunther | C03B 33/078 219/525 |
| 2,584,851 A | 2/1952 | Dunipace | |
| 3,116,863 A | 1/1964 | Long | |
| 3,556,366 A * | 1/1971 | Kim | B26F 3/06 225/1 |
| 3,587,956 A * | 6/1971 | Oelke | C03B 33/09 225/93.5 |
| 3,737,294 A | 6/1973 | Dumbaugh et al. | |
| 3,746,526 A | 7/1973 | Giffon | |
| 3,790,362 A | 2/1974 | Dahlberg et al. | |
| 3,849,097 A | 11/1974 | Giffen et al. | |
| 3,931,438 A | 1/1976 | Beall et al. | |
| 4,102,664 A | 7/1978 | Dumbaugh, Jr. | |
| 4,109,840 A * | 8/1978 | Oelke | C03B 33/09 225/2 |
| 4,113,162 A * | 9/1978 | Boehm | C03B 33/09 225/2 |
| 4,190,184 A * | 2/1980 | Oelke | C03B 33/09 225/2 |
| 4,214,886 A * | 7/1980 | Shay | B32B 37/15 65/121 |
| 4,232,809 A * | 11/1980 | Boehm | C03B 33/09 225/93 |
| 4,749,400 A * | 6/1988 | Mouly | C03B 21/04 65/97 |
| 5,342,426 A | 8/1994 | Dumbaugh, Jr. | |
| 5,559,060 A | 9/1996 | Dumbaugh, Jr. et al. | |
| 7,002,101 B2 | 2/2006 | Cuvelier | |
| 7,201,965 B2 * | 4/2007 | Gulati | B32B 17/06 428/1.1 |
| 7,423,237 B2 | 9/2008 | Kusama et al. | |
| 7,514,149 B2 * | 4/2009 | Bocko | B32B 17/06 428/426 |
| 8,007,913 B2 * | 8/2011 | Coppola | B32B 17/06 428/426 |
| 8,011,207 B2 | 9/2011 | Abramov et al. | |
| 8,051,679 B2 | 11/2011 | Abramov et al. | |
| 8,146,385 B2 | 4/2012 | Delia et al. | |
| 8,327,666 B2 | 12/2012 | Harvey et al. | |
| 8,341,976 B2 | 1/2013 | Dejneka et al. | |
| 8,584,490 B2 | 11/2013 | Garner et al. | |
| 2005/0258135 A1 | 11/2005 | Ishikawa et al. | |
| 2006/0261118 A1 * | 11/2006 | Cox | B26F 3/002 225/96 |
| 2010/0043495 A1 * | 2/2010 | Kirby | C03B 17/06 65/91 |
| 2011/0049765 A1 | 3/2011 | Li et al. | |
| 2011/0094267 A1 | 4/2011 | Aniolek et al. | |
| 2011/0127244 A1 | 6/2011 | Li | |
| 2012/0024928 A1 | 2/2012 | Matsumoto et al. | |
| 2013/0133367 A1 * | 5/2013 | Abramov | C03B 17/06 65/53 |
| 2013/0266757 A1 | 10/2013 | Giron et al. | |
| 2013/0291598 A1 | 11/2013 | Saito et al. | |
| 2013/0323469 A1 | 12/2013 | Abramov et al. | |
| 2014/0138420 A1 | 5/2014 | Peng et al. | |
| 2015/0037553 A1 | 2/2015 | Mauro | |
| 2016/0151929 A1 * | 6/2016 | Ogushi | B26F 3/002 225/2 |
| 2016/0304385 A1 | 10/2016 | Joseph, II | |
| 2017/0057863 A1 * | 3/2017 | Nakazawa | C03B 33/09 |
| 2017/0283300 A1 | 10/2017 | Barnes et al. | |

FOREIGN PATENT DOCUMENTS

| | | |
|---|---|---|
| JP | 2014073961 A | 4/2014 |
| TW | 201313639 A | 4/2013 |
| WO | 2010048263 A1 | 4/2010 |
| WO | 2010051410 A1 | 5/2010 |
| WO | 2013031773 A1 | 3/2013 |
| WO | 2014209833 A1 | 12/2014 |
| WO | 2015084668 A1 | 6/2015 |
| WO | 2015084670 A1 | 6/2015 |
| WO | 2016033040 A1 | 3/2016 |
| WO | 2016073807 A1 | 5/2016 |

* cited by examiner

APPARATUSES AND METHODS FOR HEATING MOVING GLASS RIBBONS AT SEPARATION LINES AND/OR FOR SEPARATING GLASS SHEETS FROM GLASS RIBBONS

This application claims the benefit of priority under 35 U.S.C. § 371 of International Application No. PCT/US2016/041223, filed on Jul. 7, 2016, which claims the benefit of priority to U.S. Application No. 62/189,412, filed on Jul. 7, 2015, the content of each of which is incorporated herein by reference in its entirety.

BACKGROUND

Field

The present specification generally relates to glass manufacturing apparatuses and methods and, more specifically, to apparatuses and methods for heating moving continuous glass ribbons at desired lines of separation and/or for separating glass sheets from continuous glass ribbons.

Technical Background

Continuous glass ribbons may be formed by processes such as the fusion draw process, the slot draw process, or other similar downdraw processes. The fusion draw process yields continuous glass ribbons which have surfaces with superior flatness and smoothness when compared to glass ribbons produced by other methods. Individual glass sheets sectioned from continuous glass ribbons formed by the fusion draw process can be used in a variety of devices including flat panel displays, touch sensors, photovoltaic devices, and other electronic applications. An individual glass sheet may be sectioned from a continuous glass ribbon by mechanically scoring or laser scoring the continuous glass ribbon along a scoring line and then bending the continuous glass ribbon at the scoring line to separate the individual glass sheet from the continuous glass ribbon. However, simply scoring and then bending to section individual glass sheets may result in low yields and undesirable warp.

In some applications, individual glass sheets sectioned from continuous glass ribbons (e.g., cover glasses, glass backplanes, and the like) formed by downdraw processes may be employed in both consumer and commercial electronic devices such as LCD and LED displays, computer monitors, automated teller machines (ATMs), and the like. Some of these glass sheets may include "touch" functionality which necessitates that the glass sheet be contacted by various objects including a user's fingers and/or stylus devices and, as such, the glass must be sufficiently robust to endure regular contact without damage. Moreover, such glass sheets may also be incorporated in portable electronic devices, such as mobile telephones, personal media players, and tablet computers. The glass sheets incorporated in these devices may be susceptible to damage during transport and/or use of the associated device. Accordingly, glass sheets used in electronic devices may require enhanced strength to be able to withstand not only routine "touch" contact from actual use, but also incidental contact and impacts which may occur when the device is being transported. Some glass sheets requiring such enhanced strength may be sectioned from continuous glass ribbons comprising a core layer disposed between a first cladding layer and a second cladding layer. The difference in the coefficients of thermal expansion between the core layer and the cladding layers, as well as bead size and shape, core to clad ratio, and position and thickness variations of such continuous glass ribbons, may make it particularly difficult to separate glass sheets from such continuous glass ribbon by simple mechanical or laser scoring and bending at the score line as a method of separation. Such a method of separating individual glass sheets from continuous glass ribbons may result in particularly low yields and undesirable warp. Furthermore, mechanical scoring of continuous glass ribbons is undesirably complicated by irregular surfaces and high stress present in such continuous glass ribbons.

Accordingly, a need exists for alternative apparatuses and methods that facilitate the separation of glass sheets from continuous glass ribbons.

SUMMARY

In one embodiment, an apparatus includes a translatable support portion and a heating apparatus coupled to the support portion. The heating apparatus is configured to contact a continuous glass ribbon across at least a portion of a width of the continuous glass ribbon at a desired line of separation as the support portion moves in a draw direction, thereby preferentially applying heat to a first side of the continuous glass ribbon at the desired line of separation as the continuous glass ribbon moves in the draw direction.

In another embodiment, a glass manufacturing apparatus includes a forming body configured to form a continuous glass ribbon moving in a draw direction, and a translatable separation initiation unit positioned downstream of the forming body. The translatable separation initiation unit includes a support portion, a heating apparatus coupled to the support portion, an insulator, and a scoring device. The heating apparatus is configured to contact the continuous glass ribbon across at least a portion of a width of the continuous glass ribbon at a desired line of separation as the support portion moves in the draw direction, thereby preferentially applying heat to a first side of the continuous glass ribbon at the desired line of separation as the continuous glass ribbon moves in the draw direction. The insulator is disposed between the support portion and the heating apparatus. The scoring device is configured to initiate a flaw in the continuous glass ribbon at the desired line of separation. The heating apparatus and the scoring device are positioned such that the continuous glass ribbon is disposed between the heating apparatus and the scoring device when the heating apparatus contacts the continuous glass ribbon.

In yet another embodiment, a method of separating a glass sheet from a continuous glass ribbon includes drawing molten glass in a draw direction at a speed S to form a continuous glass ribbon, and moving a heating apparatus in the draw direction at the speed S. The method further includes applying heat preferentially to a first side of the continuous glass ribbon with the heating apparatus at a desired line of separation as the continuous glass ribbon moves in the draw direction at the speed S. The method further includes separating the glass sheet from the continuous glass ribbon at the desired line of separation.

Additional features and advantages of the embodiments described herein are set forth in the detailed description, the claims, and the appended drawings.

The foregoing general description and the following detailed description provide various embodiments and provide an overview or framework for understanding the nature and character of the claimed subject matter. The accompanying drawings provide a further understanding of the

DETAILED DESCRIPTION

Figure 1:
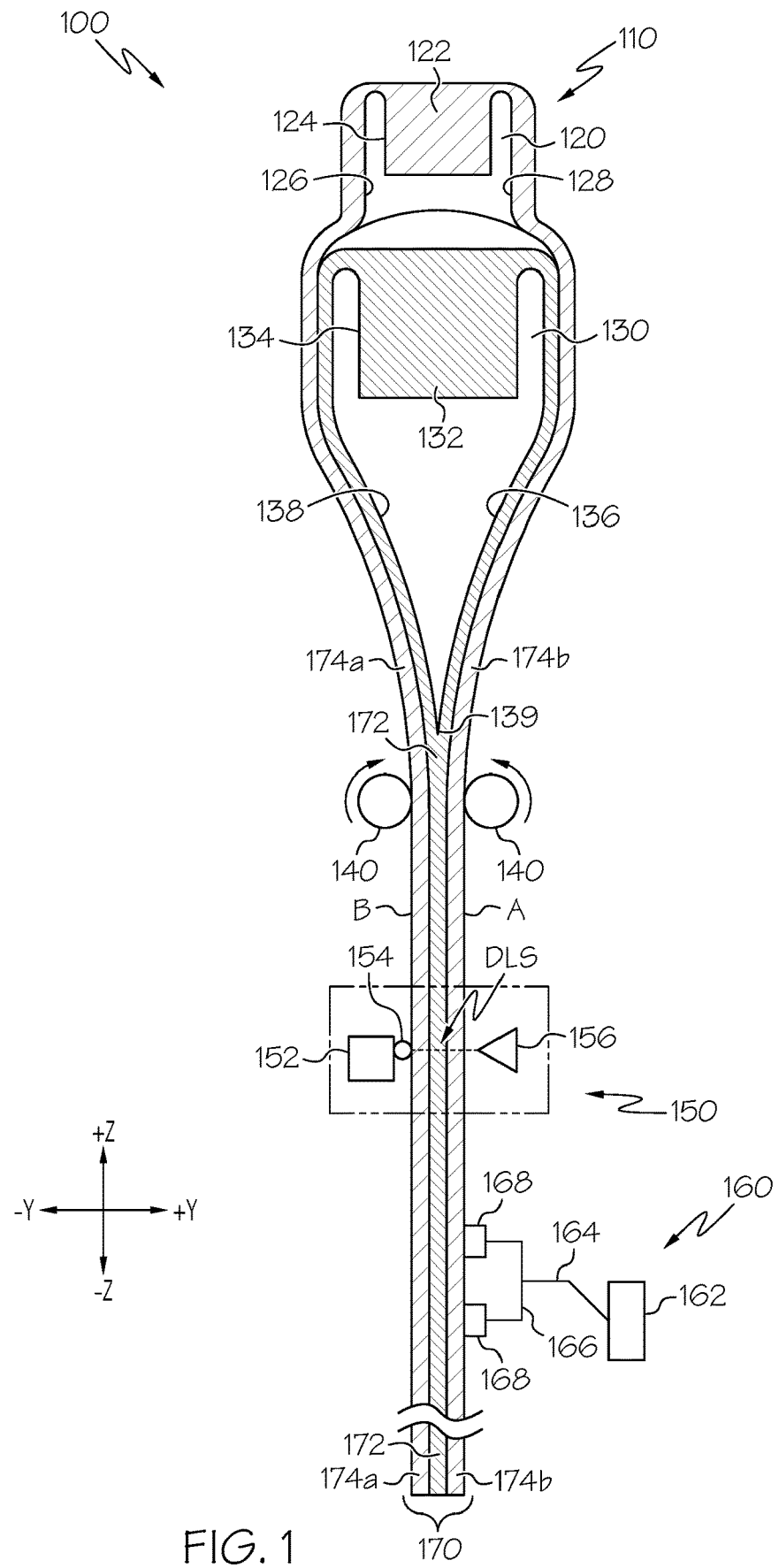
FIG. 1 schematically depicts a side view of a glass manufacturing apparatus from which a continuous glass ribbon is drawn, according to one or more embodiments shown and described herein.

Reference will now be made in detail to various embodiments of apparatuses and methods for heating moving continuous glass ribbons at desired lines of separation and/or for separating glass sheets from continuous glass ribbons, examples of which are illustrated in the accompanying drawings. Whenever possible, the same reference numerals will be used throughout the drawings to refer to the same or like parts. FIG. 1 schematically depicts one embodiment of an apparatus for heating a continuous glass ribbon moving in a draw direction. The continuous glass ribbon comprises a glass material, a ceramic material, a glass-ceramic material, or a combination thereof. The apparatus includes a support portion and a heating apparatus coupled to the support portion. The heating apparatus extends perpendicular to the draw direction. The support portion is configured to move in concert with the continuous glass ribbon for a period of time such that the heating apparatus contacts the continuous glass ribbon at a fixed location for the period of time at a desired line of separation as the continuous glass ribbon moves in the draw direction, thereby preferentially applying heat to a first side of the continuous glass ribbon at the desired line of separation as the continuous glass ribbon moves in the draw direction. Such preferential application of heat can establish a thermal gradient through a thickness or depth of the glass ribbon at the desired line of separation, which can aid in severing the glass ribbon at the desired line of separation to separate a glass sheet therefrom as described herein. Apparatuses and methods for heating moving continuous glass ribbons at desired lines of separation and/or for separating glass sheets from continuous glass ribbons are described in more detail herein with specific reference to the appended figures.

Coordinate axes are included in the drawings to provide a frame of reference for various components of the continuous glass ribbon fabrication apparatuses and methods described herein. As used herein, a "lateral" or "across-the-draw" direction is defined as the positive X or negative X direction of the coordinate axes shown in the drawings. A "downstream" or "draw" direction is defined as the negative Z direction of the coordinate axes shown in the drawings. An "upstream" direction is defined as the positive Z direction of the coordinate axes shown in the drawings. A "depth" is defined in the positive Y or negative Y direction of the coordinate axes shown in the drawings.

As used herein the term "average coefficient of thermal expansion" means the linear coefficient of thermal expansion averaged over a temperature range of 20° C.-300° C.

While the apparatuses and methods described herein are used to heat and/or separate laminated continuous glass ribbons formed by the fusion downdraw process, embodiments are not limited thereto. The apparatuses and methods described herein may be used to heat and/or separate non-continuous glass ribbons. The apparatuses and methods described herein may be used to heat and/or separate individual glass sheets or individual glass sections. Furthermore, the apparatuses and methods described herein may be used to heat and/or separate laminated, non-laminated, continuous, or non-continuous glass ribbons formed from the slot draw process, another downdraw process, the float process, or another glass ribbon manufacturing process.

In some embodiments, the continuous glass ribbon described herein may be formed by a fusion lamination process, such as the process described in U.S. Pat. No. 4,214,886, which is incorporated herein by reference. Referring to FIG. 1 by way of example, a glass manufacturing apparatus 100 for forming a continuous glass ribbon 170 and separating a glass sheet from the continuous glass ribbon 170 includes a forming body 110, a plurality of pulling rolls 140, a translatable separation initiation unit 150, and a glass engaging unit 160.

Still referring to FIG. 1, the forming body 110 includes an upper isopipe 120 positioned over a lower isopipe 130. The upper isopipe 120 includes a trough 124 into which a molten glass cladding composition 122 is fed from a melter (not shown). Similarly, the lower isopipe 130 includes a trough 134 into which a molten glass core composition 132 is fed from a melter (not shown). In the embodiments, described herein, the molten glass core composition 132 has an average coefficient of thermal expansion $CTE_{core}$ which is greater than an average coefficient of thermal expansion $CTE_{clad}$ of the molten glass cladding composition 122.

Still referring to FIG. 1, as the molten glass core composition 132 fills the trough 134, it overflows the trough 134 and flows over the outer forming surfaces 136, 138 of the lower isopipe 130. The outer forming surfaces 136, 138 of the lower isopipe 130 converge at a root 139. Accordingly, the molten glass core composition 132 flowing over the outer forming surfaces 136, 138 rejoins at the root 139 of the lower isopipe 130 thereby forming a glass core layer 172 of the continuous glass ribbon 170.

Simultaneously, the molten glass cladding composition 122 overflows the trough 124 formed in the upper isopipe 120 and flows over outer forming surfaces 126, 128 of the upper isopipe 120. The molten glass cladding composition 122 is outwardly deflected by the upper isopipe 120 such that the molten glass cladding composition 122 flows around the lower isopipe 130 and contacts the molten glass core composition 132 flowing over the outer forming surfaces 136, 138 of the lower isopipe 130, fusing to the molten glass core composition 132 and forming glass cladding layers 174*a*, 174*b* around the glass core layer 172 of the continuous glass ribbon 170.

As noted above, the molten glass core composition 132 generally has an average coefficient of thermal expansion $CTE_{core}$ which is greater than the average coefficient of thermal expansion $CTE_{clad}$ of the molten glass cladding composition 122. Accordingly, as the glass core layer 172 and the glass cladding layers 174*a*, 174*b* cool, the difference in the coefficients of thermal expansion of the glass core layer 172 and the glass cladding layers 174*a*, 174*b* cause a compressive stresses to develop in the glass cladding layers 174*a*, 174*b*. The compressive stress increases the strength of the resulting laminated glass article without an ion-exchange treatment or a thermal tempering treatment. However, such increased strength can make scoring the laminated glass article difficult.

Figure 2:
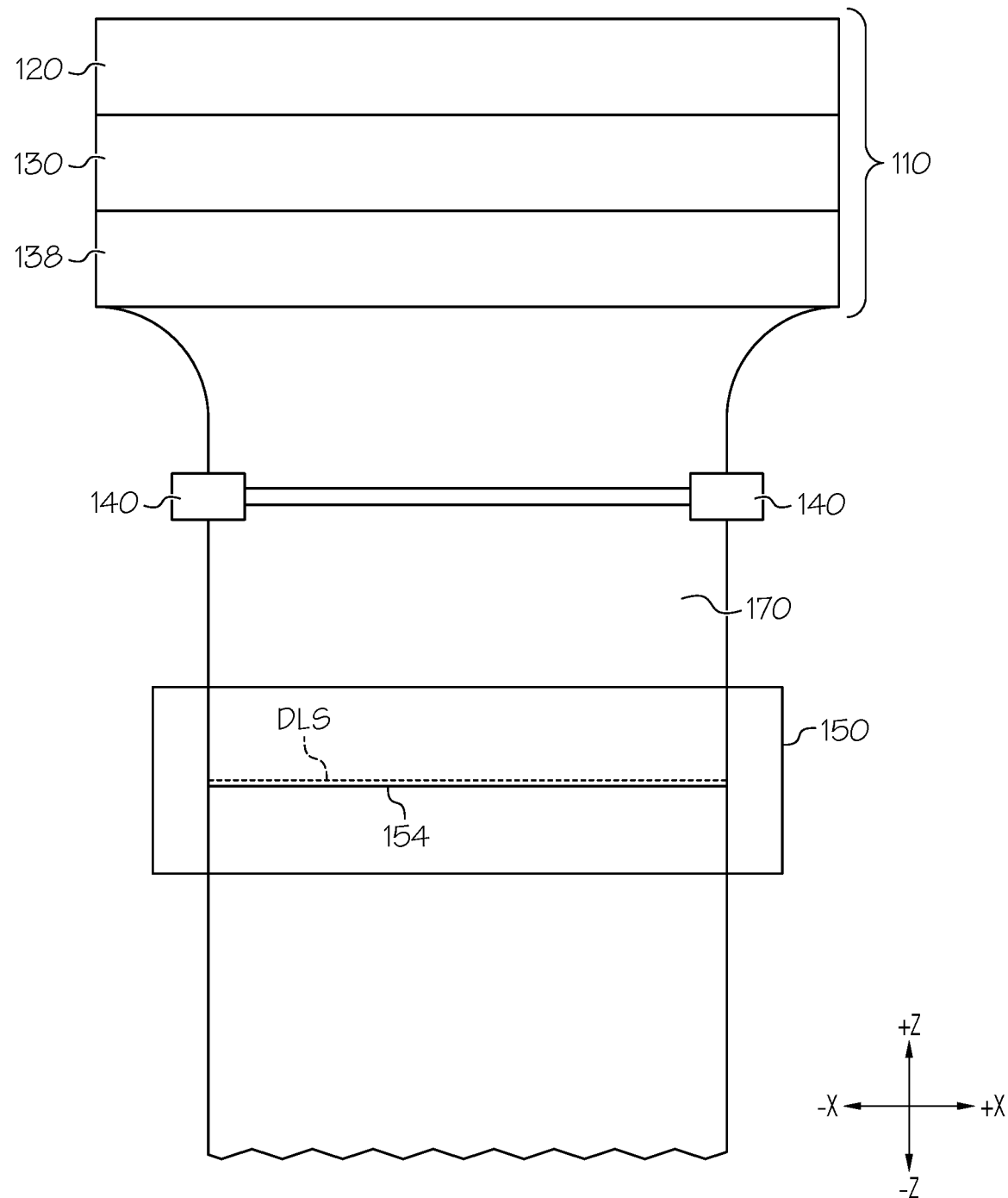
FIG. 2 schematically depicts a front view of the glass manufacturing apparatus of FIG. 1, according to one or more embodiments shown and described herein.

Still referring to FIG. 1, the plurality of pulling rolls 140 are arranged in opposing pairs and are counter-rotating. That is, a first pulling roll of the plurality of pulling rolls 140 is positioned adjacent to a first side of the continuous glass ribbon 170 (the "A" side of the continuous glass ribbon 170) and rotates in a direction opposite a second pulling roll of the plurality of pulling rolls 140 positioned across from the first pulling roll and adjacent to a second side of the continuous glass ribbon 170 (the "B" side of the continuous glass ribbon 170). The continuous glass ribbon 170 is positioned between opposing pairs of pulling rolls so that the pulling rolls contact and pinch the continuous glass ribbon 170 at the edge portions of the glass ribbon, as depicted in FIGS. 1 and 2.

Referring once again to FIG. 1, the plurality of pulling rolls 140 are driven by motors and apply a downward force to the continuous glass ribbon 170, thereby drawing the continuous glass ribbon 170 from the forming body 110 in the draw direction. The plurality of pulling rolls 140 also help support a weight of the continuous glass ribbon 170, since during at least a portion of the separation cycle the portion of the continuous glass ribbon 170 below the plurality of pulling rolls 140 may be unsupported. Without a suitable pinching force, the plurality of pulling rolls 140 may be unable to apply a sufficient downward pulling force, or may be unable to support the portion of the continuous glass ribbon 170 below the plurality of pulling rolls 140 against the force of gravity.

Still referring to FIG. 1, the translatable separation initiation unit 150 includes a support portion 152, a heating apparatus 154, and a flaw initiation device 156. The heating apparatus 154 is coupled to the support portion 152. The heating apparatus 154 includes a heating element, such as a cartridge heater, a heating rod, a heating filament, a heating wire, heat tape, or the like. In some embodiments, the heating apparatus 154 is the heating apparatus 300 depicted in FIG. 3 and described below. In some embodiments, the heating apparatus 154 is the heating apparatus 400 depicted in FIG. 4 and described below. In some embodiments, the heating apparatus 154 is the heating apparatus 500 depicted in FIG. 5 and described below. The heating apparatus 154 extends perpendicular to the draw direction (See FIG. 2). While the heating apparatus 154 extends perpendicular to the draw direction in the embodiment depicted in FIG. 2, it should be understood that in other embodiments, the heating apparatus 154 may not extend perpendicular to the draw direction. For example, in some embodiments, the heating apparatus 154 extends parallel to the draw direction. In some embodiments, the heating apparatus 154 extends at an angle between 0° and 90° relative to the draw direction.

In some embodiments, the heating apparatus 154 is configured to contact the continuous glass ribbon 170 across at least a portion of a width of the continuous glass ribbon 170 (or across an entire width of the continuous glass ribbon 170) at a desired line of separation ("DLS"), thereby preferentially heating the continuous glass ribbon 170 at the desired line of separation to facilitate the separation of a glass sheet from the continuous glass ribbon 170 at the desired line of separation. In some embodiments, the continuous glass ribbon 170 has cooled significantly from its temperature at the root 139 (which may be in the range of about 1000° C. to about 1200° C. in some embodiments) to its temperature immediately prior to being contacted by the heating apparatus 154 (which may be in the range of about 300° C. to about 400° C. in some embodiments). It should be noted that heating the continuous glass ribbon at the desired line of separation can include increasing the temperature of the continuous glass ribbon at the desired line of separation or reducing the rate of cooling of the glass ribbon at the desired line of separation. Following such heating, the temperature of the continuous glass ribbon at the desired line of separation is greater than the temperature of the continuous glass ribbon in a region thereof adjacent to and/or downstream of the desired line of separation.

In some embodiments, such as embodiments in which the heating apparatus 154 extends perpendicular to the draw direction, the desired line of separation extends perpendicular to the draw direction across at least a portion of the width of the continuous glass ribbon 170. In some embodiments, such as embodiments in which the heating apparatus 154 extends parallel to the draw direction, the desired line of separation extends parallel to the draw direction (e.g., to separate one or more edge portions or beads from the continuous glass ribbon 170). In some embodiments, such as embodiments in which the heating apparatus 154 extends at an angle between 0° and 90° relative to the draw direction, the desired line of separation extends at the same angle (e.g., to separate angled glass sheets from the continuous glass ribbon 170). In some embodiments, the heating apparatus 154 may not contact the continuous glass ribbon 170, such as when the heating apparatus 154 heats the continuous glass ribbon 170 at the desired line of separation by a non-contact modality. For example, the heating apparatus 154 can be positioned in close proximity to, but not in contact with, the continuous glass ribbon 170, thereby applying heat preferentially to a first side of the continuous glass ribbon 170 at the desired line of separation.

In some embodiments, the heating apparatus 154 contacts the continuous glass ribbon 170 across the entire width of the desired line of separation. In other embodiments, the heating apparatus 154 contacts the continuous glass ribbon 170 across only a portion of the desired line of separation. For example, in some embodiments, the heating apparatus 154 contacts one or more bead regions of the continuous glass ribbon 170 (i.e. a relatively thick region of the glass ribbon 170 near an edge thereof) without contacting a central region of the glass ribbon (e.g., disposed between bead regions at opposing edges of the glass ribbon). Such contact between the heating apparatus 154 and the glass ribbon 170 at the bead regions can help to apply relatively more heat to the bead regions compared to the non-bead regions (e.g., the central region of the glass sheet). Because the bead regions are thicker than the non-bead regions of the glass ribbon, applying relatively more heat to the bead regions can help to form a temperature gradient through the thickness of the glass ribbon that is more uniform across the width of the glass ribbon.

Figure 3:
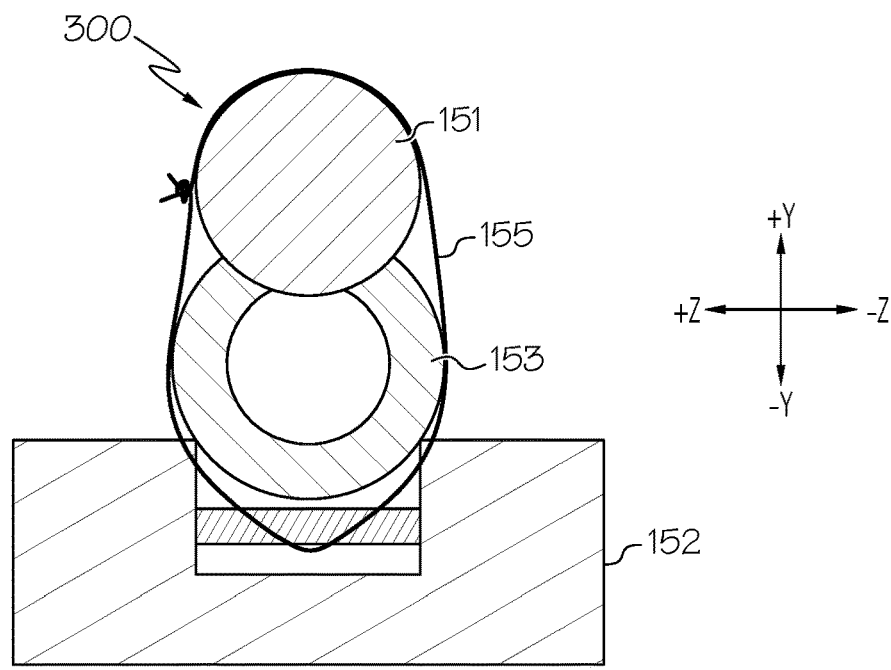
FIG. 3 schematically depicts a heating apparatus and an insulator coupled to a support portion of a translatable separation initiation unit, according to one or more embodiments shown and described herein.

Referring now to FIG. 3, a heating apparatus 300 includes a heating element 151. The heating element 151 is coupled to the support portion 152. The heating element 151 may be a cartridge heater, a heating rod, a heating filament, a heating wire, heat tape, or the like. The heating element 151 may be formed from a ceramic material, a metal material, and/or a composite material. In some embodiments, the heating element 151 is a conformal heating element, which may enhance the degree of contact between the heating element 151 and the continuous glass ribbon 170 at the desired line of separation, thereby facilitating efficient thermal transfer of thermal energy from the heating element 151 to the continuous glass ribbon 170 at the desired line of separation.

Still referring to FIG. 3, the heating element 151 is coupled, directly or indirectly, to the support portion 152 by at least one wire 155. While the heating element 151 is coupled to the support portion 152 by the at least one wire 155 in FIG. 3, in other embodiments the heating element 151 may be coupled to the support portion 152 in another manner. For example, in some embodiments, the heating element 151 is coupled to the support portion 152 by at least one fastener other than a wire, such as a clip, a screw, a bolt, a clamp, or the like. In some embodiments, the heating element 151 is adhesively affixed to the support portion 152. In some embodiments, the heating element 151 is retained within a properly sized channel of the support portion 152. In some embodiments, the heating element 151 is coupled to the insulator 153 (e.g. by a fastener such as a wire, a clip, a screw, a bolt, a clamp, adhesive, or the like), which in turn is coupled to the support portion 152 (e.g. by the same or a different fastener).

In the embodiment depicted in FIG. 3, an insulator 153 is disposed between the heating element 151 and the support portion 152. The insulator 153 may thermally and/or electrically isolate the support portion 152 from the heating element 151. In some embodiments, the insulator 153 is an insulating tube made of alumina, though other embodiments include an insulator 153 having a different shape and/or made of a different material. Some embodiments do not include the insulator 153 disposed between the heating element 151 and the support portion 152, such as embodiments in which the heating element 151 directly engages the support portion 152. In some embodiments, a narrow strip of highly conductive material may be attached to (e.g., welded to) the heating element 151. In such embodiments, the highly conductive material is configured to contact the continuous glass ribbon 170 at the desired line of separation.

Figure 4:
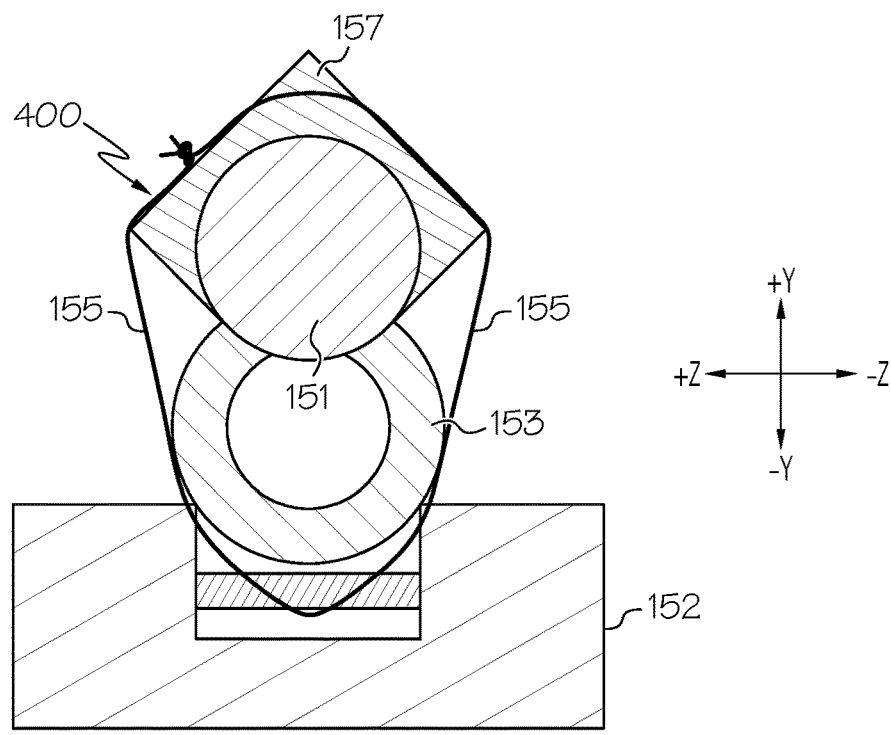
FIG. 4 schematically depicts a heating apparatus, a thermally conductive cover, and an insulator coupled to a support portion of a translatable separation initiation unit, according to one or more embodiments shown and described herein.

Referring now to FIG. 4, a heating apparatus 400 includes a heating element 151 and a thermally conductive cover 157. The heating element 151 and the thermally conductive cover 157 are coupled to the support portion 152. In the embodiment depicted in FIG. 4, the heating element 151 is disposed between the thermally conductive cover 157 and the support portion 152. The heating element 151 may be a cartridge heater, a heating rod, a heating filament, a heating wire, heat tape, or the like. The heating element 151 may be formed from a ceramic material, a metal material, and/or a composite material. In some embodiments, the thermally conductive cover 157 is formed from metal, though in other embodiments, the thermally conductive cover 157 is formed from a composite material, or any other conductive material. The thermally conductive cover 157 is configured to contact the continuous glass ribbon 170 across at least a portion of a width of the continuous glass ribbon 170 at the desired line of separation. For example, the thermally conductive cover 157 includes a point or apex having a narrower cross section (e.g., a narrower height in the draw direction) than the heating element 151. The thermally conductive cover 157 may provide a straight and/or narrow line of contact with the continuous glass ribbon 170, thereby facilitating efficient thermal transfer of thermal energy from the heating element 151 to a narrow line of separation on the continuous glass ribbon 170. Additionally, or alternatively, such a straight and/or narrow line of contact provided by the thermally conductive cover 157 may produce a line of concentrated mechanical stress at the desired line of separation (e.g., when the thermally conductive cover serves as a fulcrum about which the continuous glass ribbon 170 is bent). Furthermore, the thermally conductive cover 157 may also provide structural rigidity to the heating element 151.

Still referring to FIG. 4, the heating element 151 and the thermally conductive cover 157 are coupled to the support portion 152 by the at least one wire 155. The at least one wire 155 passes through the thermally conductive cover 157 and secures the assembly of the thermally conductive cover 157, the heating element 151, and the insulator 153 to the support portion 152. While the heating element 151 and the thermally conductive cover 157 are coupled to the support portion 152 by the at least one wire 155 in FIG. 4, in other embodiments the heating element 151 and the thermally conductive cover 157 may be coupled to the support portion 152 in another manner. For example, in some embodiments, the heating element 151 and the thermally conductive cover 157 are coupled to the support portion 152 with at least one fastener other than a wire, such as a clip, a screw, a bolt, a clamp, or the like. In some embodiments, the heating element 151 and the thermally conductive cover 157 are adhesively affixed to the support portion 152. In some embodiments, the heating element 151 is retained within a properly sized channel of the support portion 152. In some embodiments, the heating element 151 and the thermally conductive cover 157 are coupled to the insulator 153, which in turn is coupled to the support portion 152.

In the embodiment depicted in FIG. 4, an insulator 153 is disposed between the heating element 151 and the support portion 152. The insulator 153 may thermally and/or electrically isolate the support portion 152 from the heating element 151. In some embodiments, the insulator 153 is an insulating tube made of alumina, though other embodiments include an insulator 153 having a different shape and/or made of a different material. Some embodiments do not include the insulator 153 disposed between the heating element 151 and the support portion 152, such as embodiments in which the heating element 151 directly engages the support portion 152.

Figure 5:
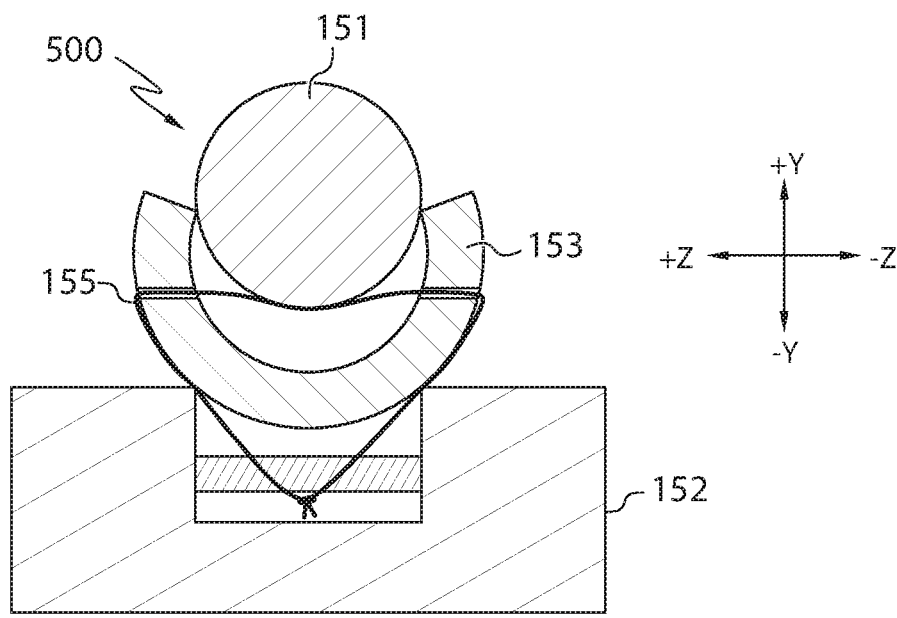
FIG. 5 schematically depicts a heating apparatus disposed within an insulator that is coupled to a support portion of a translatable separation initiation unit, according to one or more embodiments shown and described herein.

Referring now to FIG. 5, a heating apparatus 500 includes a heating element 151. The heating element 151 is disposed within an insulator 153, which in turn is coupled to the support portion 152. The heating element 151 may be a cartridge heater, a heating rod, a heating filament, a heating wire, heat tape, or the like. The heating element 151 may be formed from a ceramic material, a metal material, and/or a composite material. In some embodiments, the heating element 151 is a conformal heating element, which may enhance the degree of contact between the heating element 151 and the continuous glass ribbon 170 at the desired line of separation, thereby facilitating efficient thermal transfer of thermal energy from the heating element 151 to the continuous glass ribbon 170 at the desired line of separation.

In the embodiment depicted in FIG. 5, the insulator 153 is disposed between the heating element 151 and the support portion 152. The insulator 153 may thermally and/or electrically isolate the support portion 152 from the heating element 151. In some embodiments, the insulator 153 is an insulating tube made of alumina, though other embodiments include an insulator 153 having a different shape and/or made of a different material. The heating element 151 is at least partially enclosed within a body of the insulator 153. In the embodiment depicted in FIG. 5, the heating element 151 protrudes through an elongate aperture in the insulator 153 and beyond the body of the insulator 153 such that the heating element 151 may contact the continuous glass ribbon 170 at the desired line of separation while avoiding contact between the insulator 153 and the continuous glass ribbon 170, even if the continuous glass ribbon 170 bends slightly at the point of contact with the heating element 151 (e.g., to partially wrap around the heating element). In some embodiments, a narrow strip of highly conductive material may be attached to (e.g., welded to) the heating element 151. In such embodiments, the highly conductive material is configured to contact the continuous glass ribbon 170 at the desired line of separation.

Still referring to FIG. 5, the insulator 153 is coupled to the support portion 152 by at least one wire 155 that traverses the body of the insulator 153. The wire can help to maintain the position of the heating element 151 within the insulator 153. For example, the wire can engage the heating element 151 to push the heating element into an aperture in the insulator 153 such that the heating element is secured between the wire and the insulator and protrudes beyond the insulator as shown in FIG. 5. In some embodiments, the insulator 153 may be coupled to the support portion 152 in another manner, such as in embodiments in which the insulator 153 is adhesively affixed to the support portion 152 or in embodiments in which the insulator 153 is retained within a properly sized channel of the support portion 152. In some embodiments, the insulator 153 is coupled to the support portion 152 with at least one fastener other than a wire, such as a clip, a screw, a bolt, a clamp, or the like.

Figure 5A:
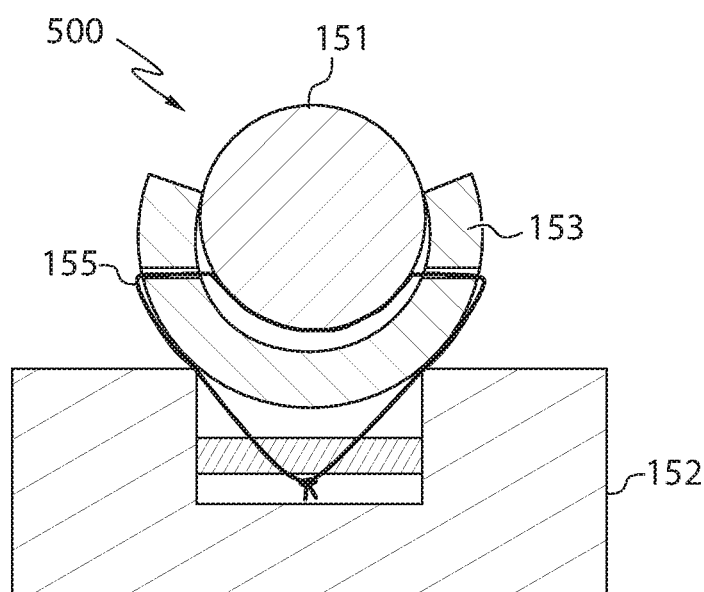
FIG. 5A schematically depicts a heating apparatus disposed within an insulator that is coupled to a support portion of a translatable separation initiation unit, according to one or more embodiments shown and described herein.

In various embodiments, the heating element 151 can protrude beyond the insulator 153 by a suitable distance. For example, in the embodiment shown in FIG. 5, the aperture in the insulator 153 has a width that is slightly less than a diameter of the heating element 151 such that the heating element 151 protrudes beyond the insulator 153 by a distance approximately equal to one-half of the diameter of the heating element 151. In other words, the aperture in the insulator 153 is sized such that the insulator engages the heating element 151 approximately at a midpoint of the heating element 151 such that approximately one-half of the heating element 151 is disposed within the insulator 153 and approximately one-half of the heating element protrudes beyond the insulator 153. FIG. 5A is depicts another embodiment in which the width of the aperture in the insulator 153 is smaller than in FIG. 5. Thus, in the embodiment shown in FIG. 5A, the heating element 151 protrudes beyond the insulator 153 by a shorter distance compared to the embodiment shown in FIG. 5. In other words, in the embodiment shown in FIG. 5A, a greater proportion of the heating element 151 is disposed within the insulator 153, and a smaller proportion of the heating element 151 protrudes beyond the insulator 153 compared to the embodiment shown in FIG. 5. In various embodiments, the insulator 151 protrudes beyond the insulator 153 by a distance, for example, of at least about 1 mm, at least about 1.5 mm, at least about 2 mm, or at least about 2.5 mm. Additionally, or alternatively, the insulator 151 protrudes beyond the insulator 153 by a distance, for example, of at most about 50 mm, at most about 40 mm, at most about 30 mm, at most about 20 mm, at most about 10 mm, at most about 5 mm, at most about 4.5 mm, at most about 4 mm, or at most about 3.5 mm.

Referring once again to FIG. 1, the flaw initiation device 156 is configured to initiate a flaw at the desired line of separation of the continuous glass ribbon 170. The flaw initiation device 156 may initiate a flaw at the desired line of separation before, during, or after the continuous glass ribbon 170 is heated at the desired line of separation as described herein. In some embodiments, the flaw initiation device 156 includes a scoring device. In embodiments that include the scoring device, the scoring device is configured to score the continuous glass ribbon 170 across at least a portion of the desired line of separation. In some embodiments, the scoring device scores the continuous glass ribbon 170 across the entire width of the desired line of separation. In other embodiments, the scoring device scores the continuous glass ribbon 170 across only a portion of the desired line of separation. For example, some embodiments may only score a bead region of the continuous glass ribbon 170 (i.e. a widthwise portion of the continuous glass ribbon 170 that extends across the draw to a distance from an edge of the continuous glass ribbon 170), a knurl region of the continuous glass ribbon 170 (i.e. a widthwise portion of the continuous glass ribbon 170 that extends across the draw and includes a knurled pattern as a result of contacting one or more pulling rollers), between a bead region and knurl region, a central region disposed between knurled and/or bead regions on opposing edges of the continuous glass ribbon, etc. In some embodiments, a widthwise central portion of the continuous glass ribbon may include the glass core layer 172 disposed between the glass cladding layers 174a, 174b, while bead regions at the edges of the continuous glass ribbon may only include the glass core layer 172 and no glass cladding layers 174a, 174b. Thus, the glass core layer 172 protrudes out from between the glass cladding layers 174a, 174b at the edges of the glass ribbon 170. In some such embodiments, the flaw initiation device 156 may introduce a flaw in the glass core layer 172 of one more of the beads (which only include the glass core layer 172) at the desired line of separation, without introducing the flaw into the glass cladding layers 174a, 174b. Introducing the flaw into the protruding edges of the glass core layer 172 can be relatively easier than introducing a flaw into one or both of the glass cladding layers 174a, 174b because the protruding edges of the glass core layer are not under compressive stress that resists flaw generation. In some embodiments, the heat applied to the desired line of separation may direct the flaw across the desired line of separation.

In some embodiments in which the flaw initiation device 156 includes a scoring device, the scoring device scores a small width of the continuous glass ribbon 170 at the desired line of separation, such as in embodiments in which the scoring device scores a 100 mm or smaller width of the continuous glass ribbon 170 at an edge of the continuous glass ribbon 170. In some embodiments, the flaw initiation device 156 is configured to initiate a flaw at an edge of the continuous glass ribbon 170. In embodiments that mechanically score the continuous glass ribbon 170 across only a portion of the desired line of separation, a scoring wheel and/or other components of the scoring device may last longer, leading to cost savings realized from less frequent replacement of such components. Furthermore, in embodiments that mechanically score the continuous glass ribbon 170 across only a portion of the desired line of separation, the scoring device may be less likely to strike a pre-existing crack in the ribbon, leading to a reduced likelihood of the negative consequences of the scoring device striking a pre-existing crack while scoring. In embodiments that heat the continuous glass ribbon 170 across the desired line of separation as described herein, edge flaws typical of mechanical scoring may be reduced.

In some embodiments, the flaw initiation device 156 includes at least one device other than a scoring device. For example, in some embodiments, the flaw initiation device 156 includes a laser, an ultrasonic transducer, a carbide tip, a diamond tip or stylus, a hot filament, a cooling apparatus, a heater (e.g., a silicon nitride heater), a drop or stream of fluid (e.g., water, air, etc.) or the like. In some embodiments, the flaw may be initiated by a drop of water applied by a damp object. In some embodiments, fluid (e.g., water, air, etc.) may be applied before, during, or after the flaw initiation device 156 initiates a flaw in the continuous glass ribbon 170 at the desired line of separation, in order to enhance the initiated flaw. In some embodiments, the flaw initiation device 156 may include a mechanical flaw initiation device (e.g., a scoring device, a tip or stylus, or the like) as well as an auxiliary heater, which may function to enhance separation as described herein.

Still referring to FIG. 1, the flaw initiation device 156 is positioned on the translatable separation initiation unit 150 relative to the heating apparatus 154 such that the continuous glass ribbon 170 is disposed between the heating apparatus 154 and the flaw initiation device 156 when the heating apparatus 154 contacts the continuous glass ribbon 170. In other embodiments, the flaw initiation device 156 is positioned on the same side of the translatable separation initiation unit 150 as the heating apparatus 154 such that the heating apparatus 154 contacts a first side of the continuous glass ribbon 170 along the desired line of separation and the flaw initiation device 156 initiates a flaw in the first side of the continuous glass ribbon 170 at the desired line of separation. In some embodiments, the flaw initiation device 156 is included in the heating apparatus 154. In some embodiments in which the heating apparatus 154 includes the flaw initiation device 156, the flaw initiation device 156 is positioned at an end of the heating apparatus 154 such that the flaw initiation device 156 is configured to introduce a flaw in an edge of the continuous glass ribbon 170 when the heating apparatus 154 contacts the continuous glass ribbon 170.

Some embodiments do not include a flaw initiation device 156, such as embodiments in which a glass sheet separates from the continuous glass ribbon 170 at the desired line of separation as a direct result of heating the continuous glass ribbon 170 at the desired line of separation, or as a result of heating the continuous glass ribbon 170 at the desired line of separation and imparting a bending moment to the continuous glass ribbon 170 about the desired line of separation. In embodiments that do not include the flaw initiation device 156, cost savings can be realized in equipment and service as a result of not requiring the flaw initiation device 156 to initiate separation of a glass sheet from the continuous glass ribbon 170.

In some embodiments, the translatable separation initiation unit 150 may also include a counternosing, which may stabilize the continuous glass ribbon 170 as the continuous glass ribbon 170 is heated by the heating apparatus 154, maintain flush contact between the continuous glass ribbon 170 and the heating apparatus 154, and/or reduce vibration up the draw during separation. In embodiments that include the counternosing, the heating apparatus 154 may contact a first side of the continuous glass ribbon 170 at the desired line of separation and the counternosing may contact a second side of the continuous glass ribbon 170 at the desired line of separation when the heating apparatus contacts the first side of the continuous glass ribbon 170 at the desired line of separation. In some embodiments, the counternosing may include the flaw initiation device 156. In some embodiments that include the counternosing, the flaw initiation device 156 may be coupled to the counternosing.

Figure 6:
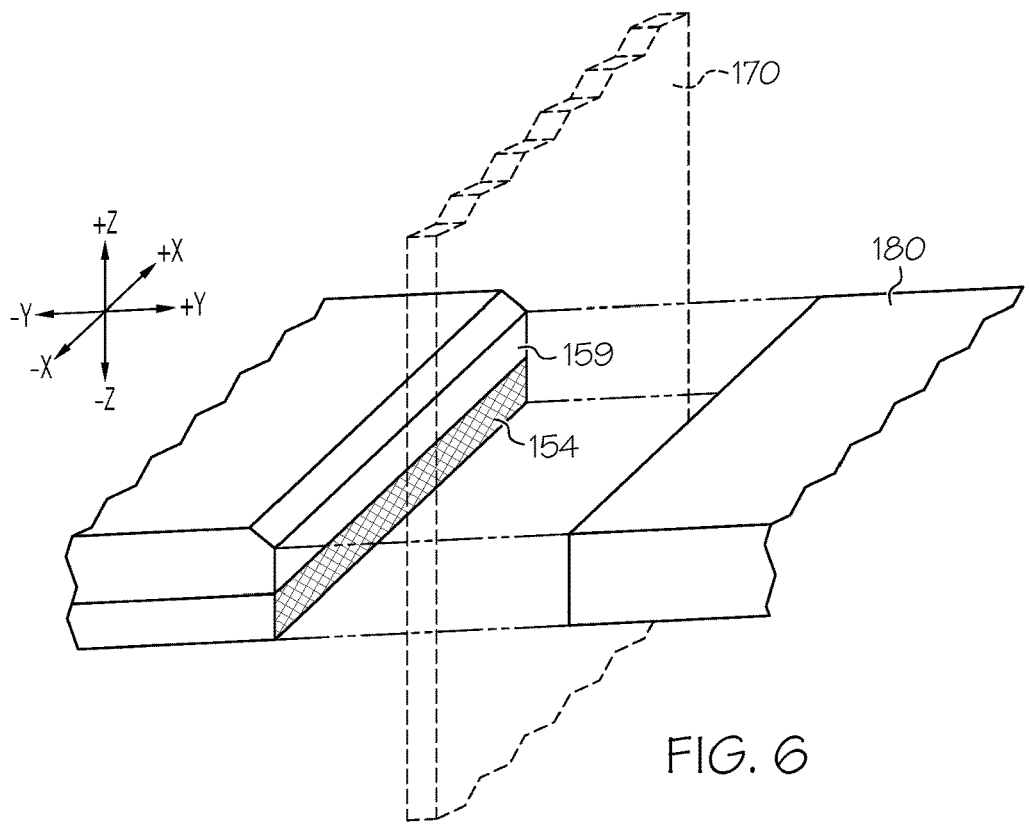
FIG. 6 schematically depicts a portion of a translatable separation initiation unit including a heating apparatus and an opposing counternosing, according to one or more embodiments shown and described herein.

Embodiments may include one or more counternosings in a variety of configurations. For example, FIG. 6 depicts a portion of a translatable separation initiation unit that includes the heating apparatus 154 and a nosing 159 configured to contact a first side of the continuous glass ribbon 170 at the desired line of separation, and a counternosing 180 configured to contact a second side of the continuous glass ribbon 170 at the desired line of separation when the heating apparatus 154 contacts the first side of the continuous glass ribbon 170. The counternosing 180 depicted in FIG. 6 has a width greater than or equal to a width of the continuous glass ribbon 170 such that the counternosing 180 is in contact with the second side of the continuous glass ribbon 170 at the desired line of separation across the entire width of the continuous glass ribbon 170. In some embodiments, the counternosing 180 may have a width slightly less than the width of the continuous glass ribbon 170, such that the width of the counternosing 180 is less than the width of the continuous glass ribbon 170, but greater than 75% of the width of the continuous glass ribbon 170.

Figure 7:
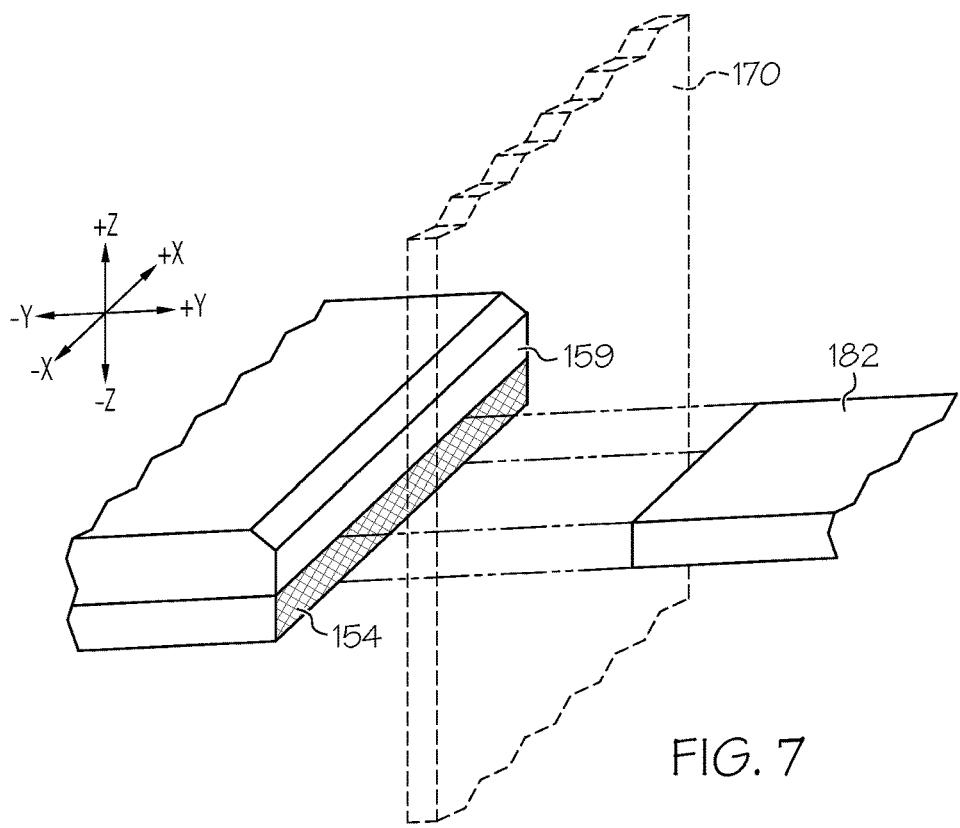
FIG. 7 schematically depicts a portion of a translatable separation initiation unit including a heating apparatus and an opposing counternosing, according to one or more embodiments shown and described herein.

FIG. 7 depicts a portion of a translatable separation initiation unit that includes the heating apparatus 154 and a nosing 159 configured to contact a first side of the continuous glass ribbon 170 at the desired line of separation, and a counternosing 182 configured to contact a second side of the continuous glass ribbon 170 at the desired line of separation when the heating apparatus 154 contacts the first side of the continuous glass ribbon 170. The counternosing 182 depicted in FIG. 7 has a width smaller than the width of the continuous glass ribbon 170 and is configured to contact a central portion of the continuous glass ribbon 170 when the heating apparatus is in contact with the continuous glass ribbon 170 at the desired line of separation.

Figure 8:
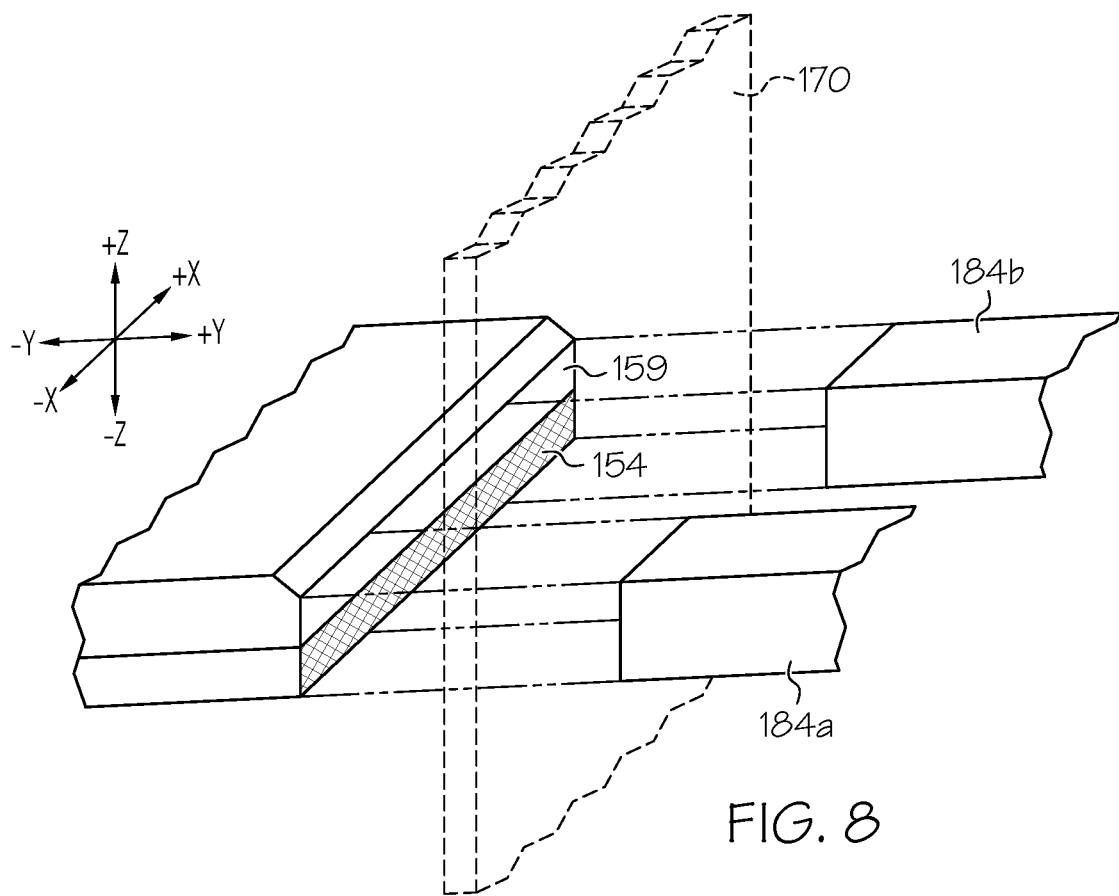
FIG. 8 schematically depicts a portion of a translatable separation initiation unit including a heating apparatus and a pair of opposing counternosings, according to one or more embodiments shown and described herein.

FIG. 8 depicts a portion of a translatable separation initiation unit that includes the heating apparatus 154 and a nosing 159 configured to contact a first side of the continuous glass ribbon 170 at the desired line of separation, and a first counternosing 184*a* and a second counternosing 184*b* configured to contact a second side of the continuous glass ribbon 170 at the desired line of separation when the heating apparatus 154 contacts the first side of the continuous glass ribbon 170. The first counternosing 184*a* and the second counternosing 184*b* are spaced apart widthwise and configured to contact bead portions of the continuous glass ribbon 170 when the heating apparatus is in contact with the continuous glass ribbon 170 at the desired line of separation. In some embodiments, the counternosing is restricted to the region of the clad bead and knurl at each edge of the continuous glass ribbon 170. The configuration shown in FIG. 8 can help to ensure contact between the heating apparatus 154 and the bead and/or knurl regions of the glass ribbon 170 at the desired line of separation.

The nosings and/or counternosing described herein may be formed from a variety of materials, including aluminum, stainless steel, alumino-silicate fibers, silicone rubber, plastic, or the like. Furthermore, some embodiments may utilize a backing or support fixture instead of a nosing or counternosing. Some embodiments may include a heating apparatus in the counternosing or may include a heating apparatus that contacts a second side of the continuous glass ribbon 170 instead of the counternosing. While the embodiments of FIGS. 6-8 include the nosing 159 configured to contact the first side of the continuous glass ribbon 170, some embodiments do not include the nosing 159, such as embodiments in which only the heating apparatus 154 contacts the first side of the continuous glass ribbon. In some embodiments that include one or more counternosings, the one or more counternosings may be configured to contact the continuous glass ribbon above or below the desired line of separation.

Figure 9:
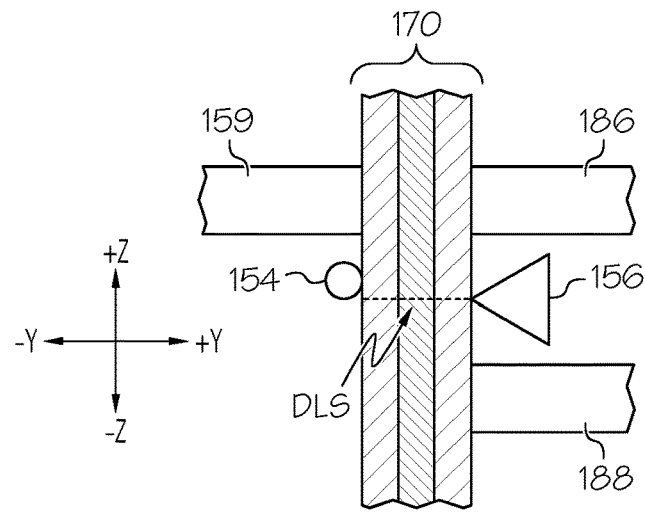
FIG. 9 schematically depicts a side view of a continuous glass ribbon engaged by a nosing, a pair of counternosings, a heating apparatus, and a flaw initiation device, according to one or more embodiments shown and described herein.

Referring now to FIG. 9, a side view of the continuous glass ribbon 170 in engagement with a nosing 159, a first counternosing 186, the heating apparatus 154, the flaw initiation device 156, and a second counternosing 188 is schematically depicted. The continuous glass ribbon 170 may be pressed between the nosing 159 and the first counternosing 186, such that the nosing 159 and the first counternosing 186 engage the continuous glass ribbon 170 therebetwen. The continuous glass ribbon 170 may be heated along a desired line of separation by the heating apparatus 154. The flaw initiation device 156 may initiate a flaw in the second side of the continuous glass ribbon 170 (either before, during, or after the continuous glass ribbon 170 is heated along the desired line of separation by the heating apparatus 154). A sheet of glass may be separated from the continuous glass ribbon at the desired line of separation by the second counternosing 188, which moves in the −Y direction to separate the glass sheet from the continuous glass ribbon 170. In some embodiments, each of the nosing 159, the first counternosing 186, the second counternosing 188, the heating apparatus 154, and the flaw initiation device 156 may be components of the translatable separation initiation unit 150 described herein, though in other embodiments, one or more of the nosing 159, the first counternosing 186, the second counternosing 188, the heating apparatus 154, and the flaw initiation device 156 may be separate from the translatable separation initiation unit 150. In some embodiments, one or more of the nosing 159, the first counternosing 186, and the second counternosing 188 may instead be a heat sink or cooling apparatus.

Figure 10:
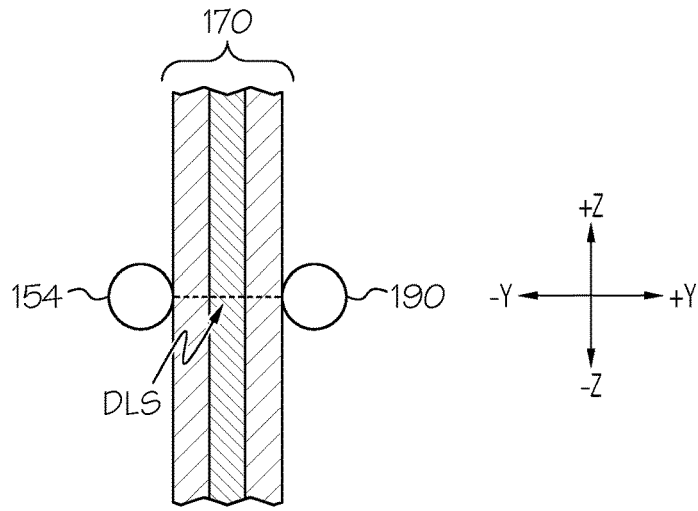
FIG. 10 schematically depicts a side view of a continuous glass ribbon disposed between a heating apparatus and a cooling apparatus, according to one or more embodiments shown and described herein.

In some embodiments, the glass manufacturing apparatus may include a cooling apparatus configured to contact the continuous glass ribbon 170 at the desired line of separation. In some embodiments, the cooling apparatus extends perpendicular to the draw direction and is configured to contact the continuous glass ribbon 170 across at least a portion of the width of the continuous glass ribbon 170 at the desired line of separation as the continuous glass ribbon 170 moves in the draw direction. For example, referring now to FIG. 10, the continuous glass ribbon 170 is disposed between the heating apparatus 154 and a cooling apparatus 190, such that the heating apparatus 154 contacts a first side of the continuous glass ribbon 170 at the desired line of separation and the cooling apparatus 190 contacts a second side of the continuous glass ribbon 170 at the desired line of separation. In some embodiments, the cooling apparatus 190 extends parallel to the draw direction or extends at an angle between 0° and 90° relative to the draw direction.

In embodiments that include the cooling apparatus 190, the cooling apparatus 190 may include a cold wire, a cold rod, a cold tube, or another cold element having a temperature less than the continuous glass ribbon 170 at the location at which the cooling apparatus 190 cools the continuous glass ribbon 170. In some embodiments, the cooling apparatus 190 is actively cooled, such as by circulating cold water through the cooling apparatus 190. In other embodiments, the cooling apparatus 190 may be at ambient temperature. In some embodiments, the cooling apparatus 190 is a component of the translatable separation initiation unit 150, though in other embodiments the cooling apparatus 190 may be separate from the translatable separation initiation unit 150. In some embodiments, the cooling apparatus 190 may contact the continuous glass ribbon 170 above or below the desired line of separation. In some embodiments, a second side of the continuous glass ribbon 170 may be cooled at the desired line of separation, a first side of the continuous glass ribbon 170 may be heated at the desired line of separation by the heating apparatus 154, and the second side of the continuous glass ribbon 170 may be cooled by the cooling apparatus 190 to facilitate separation (e.g., thermal shock separation resulting from applying the cooling apparatus 190, or enhancing mechanical separation by the glass engaging unit 160, for example).

Figure 11:
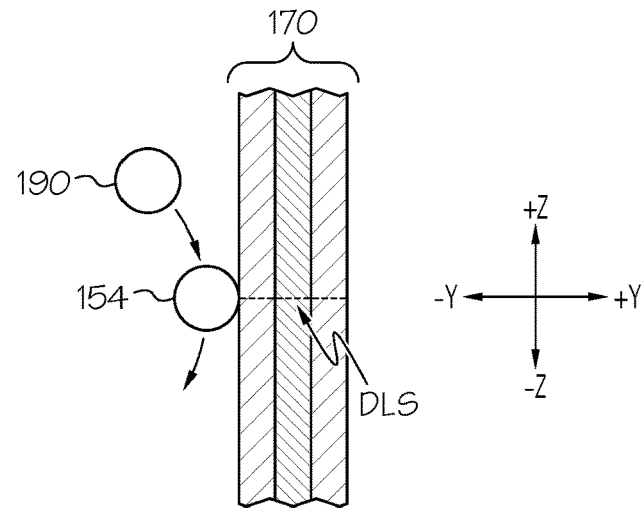
FIG. 11 schematically depicts a side view of a heating apparatus and cooling apparatus disposed on the same side of a continuous glass ribbon, according to one or more embodiments shown and described herein.

Referring now to FIG. 11, the heating apparatus 154 and the cooling apparatus 190 are disposed on the same side of the continuous glass ribbon 170, such that the heating apparatus 154 first contacts a first side of the continuous glass ribbon 170 at the desired line of separation and the cooling apparatus 190 then contacts the first side of the continuous glass ribbon 170 at the desired line of separation. The cooling apparatus 190 may include a cold wire, a cold rod, a cold tube, or any other cold element having a temperature less than the temperature of the continuous glass ribbon 170 at the location at which the cooling apparatus 190 cools the continuous glass ribbon 170. In some embodiments, the cooling apparatus 190 is actively cooled, such as by circulating cold water through the cooling apparatus 190. In other embodiments, the cooling apparatus 190 may be at ambient temperature. In some embodiments, the cooling apparatus 190 is a component of the translatable separation initiation unit 150, though in other embodiments the cooling apparatus 190 may be separate from the translatable separation initiation unit 150. In some embodiment, the cooling apparatus 190 and the heating apparatus 154 may be coupled to a drum, which may be rotated such that the heating apparatus 154 first contacts the continuous glass ribbon 170 and then the cooling apparatus 190 contacts the continuous glass ribbon 170 (e.g., by rotating the drum to move the heating apparatus away from the glass ribbon and the cooling apparatus toward the glass ribbon). In some embodiments, the cooling apparatus 190 may contact the continuous glass ribbon 170 above or below the desired line of separation. Some embodiments that include a cooling apparatus may not include a heating apparatus, such as embodiments in which a cooling apparatus engages the continuous glass ribbon 170 and thermally induces separation. Not to be bound by theory, but it is believed that separation of a glass sheet from the continuous glass ribbon 170 at the desired line of separation is enhanced by the methods and apparatuses described herein that include a heating apparatus and a cooling apparatus because the continuous glass ribbon initially includes compression regions in the cladding layers and a tension region in the core layer, heat applied to a cladding layer at the desired line of separation reduces the compression of the cladding layer, and a rapid thermal shock by cooling the cladding layer changes the cladding layer to a tension state quickly, causing the continuous glass ribbon 170 to separate at the desired line of separation.

Some embodiments may apply the principles herein to separate beads from a central portion of the continuous glass ribbon 170 by heating the continuous glass ribbon along desired lines of separation that extend in the draw direction, and subsequently separating the beads from the central portion along the desired lines of separation.

Figure 12:
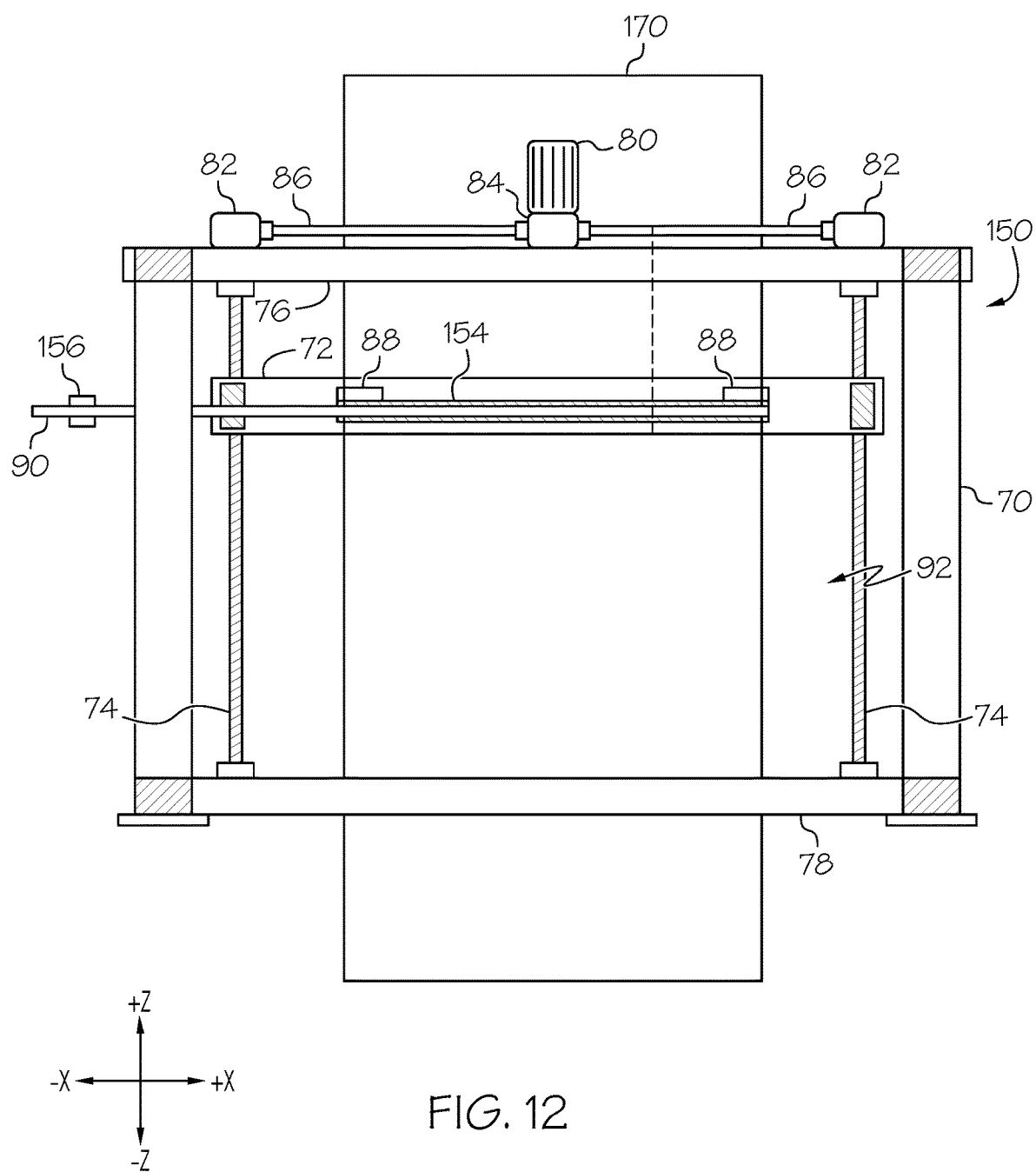
FIG. 12 schematically depicts a translatable separation initiation unit, according to one or more embodiments shown and described herein.

Referring now to FIG. 12, additional components of an embodiment of the translatable separation initiation unit 150 are depicted. The translatable separation initiation unit comprises a frame 70 and a carriage assembly 72 coupled thereto. Frame 70 may be rigidly coupled to structural components of the facility in which the glass making apparatus is housed. For example, frame 70 may be rigidly coupled to the structural steel or concrete of a factory building. In the embodiment depicted in FIG. 12, travel screws 74 are rotatably mounted on frame 70 and extend between an upper frame member 76 and a lower frame member 78. Travel screws 74 may be coupled to at least one motor configured to turn the travel screws. For example, FIG. 12 depicts a single motor 80 driving two travel screws 74 through gear boxes 82, a transmission 84 and drive axles 86. Other arrangements are possible.

Carriage assembly 72 includes at least one follower nut coupled thereto and through which a travel screw 74 passes. As a travel screw 74 turns, the follower nut travels along the screw in a direction dependent on the direction of rotation of the screw, therefore driving the carriage assembly in the direction of the follower nut. The heating apparatus 154 is coupled to the carriage assembly 72. For example, the heating apparatus 154 may be coupled to the carriage assembly 72 by one or more linear slides 88 configured to extend or retract the heating apparatus 154 toward or away from the continuous glass ribbon 170, respectively, in a direction orthogonal to the draw direction. In the extended position, the heating apparatus 154 is engaged with (e.g. contacting) the continuous glass ribbon 170. In the retracted position, the heating apparatus 154 is disengaged from the continuous glass ribbon 170.

The carriage assembly 72 may further comprise the flaw initiation device 156, which is coupled to the carriage assembly 72 through the rail 90. The flaw initiation device 156 is driven along the rail 90 by any drive mechanism capable of traversing the flaw initiation device 156 in a suitably precise path. For example, the flaw initiation device 156 may be driven along the rail 90 by a travel screw and follower nut in a manner similar to the arrangement for the carriage assembly 72. In embodiments in which the flaw initiation device 156 is a scoring device, pneumatic operation of the scoring device may be used. Such a scoring device may also include one or more pneumatic or stepper motor-activated linear slides configured to extend or retract the scoring device, or a portion thereof, toward the continuous glass ribbon 170 or away from the continuous glass ribbon 170, respectively, in a direction orthogonal to the draw direction. In the extended position, the scoring device is engaged with (e.g. contacting) the continuous glass ribbon 170. In the retracted position, the scoring device is disengaged from the continuous glass ribbon 170. In some embodiments, scoring may be accomplished in a non-contact manner, wherein scoring is accomplished by way of a laser beam. In such cases, extension and retraction of the scoring device may not be necessary. In some embodiments, the scoring device produce a score that is substantially perpendicular to the draw direction.

It should be understood that the translatable separation initiation unit 150 is not limited to the embodiments described herein. In some embodiments, the translatable separation initiation unit 150 may include a carriage assembly that is moved along a frame in a manner other than with travel screws and follower nuts. For example, in some embodiments, a carriage assembly may be moved with one or more linear actuators operable to translate the carriage assembly in the draw direction and opposite the draw direction.

A method of heating a moving continuous glass ribbon and for separating a glass sheet from the moving continuous glass ribbon will now be described Referring once again to FIG. 1, molten glass is drawn from the forming body 110 by the plurality of pulling rolls 140 to form the continuous glass ribbon 170. The continuous glass ribbon 170 moves from the forming body 110 with a velocity vector Vr comprising a speed S in the draw direction. The translatable separation initiation unit 150, which includes the heating apparatus 154 moves in the draw direction from an initial start position and attains a velocity that matches that of the moving continuous glass ribbon 170. That is, the translatable separation initiation unit 150 acquires a velocity vector Vt that matches the velocity vector of the glass ribbon. Accordingly, the heating apparatus 154 (and the translatable separation initiation unit 150 of which the heating apparatus 154 is a component) and the continuous glass ribbon 170 simultaneously travel at the speed S in the draw direction.

As the continuous glass ribbon 170 moves, the translatable separation initiation unit 150 contacts and heats the continuous glass ribbon 170 with the heating apparatus 154 across at least a portion of a width of the continuous glass ribbon 170 at a desired line of separation ("DLS") (e.g., by extending the heating apparatus 154 to be in contact with the desired line of separation, as described above with reference to FIG. 12). Referring to FIG. 2, the desired line of separation extends laterally across the draw in a direction perpendicular to the draw direction. As noted above, embodiments are not limited to the desired line of separation extending laterally across the draw in a direction perpendicular to the draw direction. For example, in some embodiments, the translatable separation initiation unit 150 contacts and heats the continuous glass ribbon 170 with the heating apparatus 154 at a desired line of separation that extends parallel to the draw direction or at an angle of between 0° and 90° relative to the draw direction.

Referring once again to FIG. 1, a sheet of glass may then be separated from the continuous glass ribbon 170 at the desired line of separation. In some embodiments, separating the sheet of glass from the continuous glass ribbon 170 may include initiating a flaw at the desired line of separation with the flaw initiation device 156 described above. In some embodiments, the flaw initiation device 156 may be a scoring device that scores the continuous glass ribbon 170 at the desired line of separation. It should be apparent that to produce a score that is perpendicular to the edge portions of the moving continuous glass ribbon 170 the scoring device must also move such that there is no relative motion between the scoring device and the glass ribbon in the draw direction during the scoring process. After carriage assembly 72 (See FIG. 12) has attained a speed equal to or substantially equal to the speed of the glass ribbon in the draw direction, the heating apparatus 154 is extended to contact the continuous glass ribbon 170. The translatable separation initiation unit 150 may initiate a flaw at the desired line of separation with the flaw initiation device 156 either before heating, while heating, or after heating the continuous glass ribbon 170 at the desired line of separation.

Still referring to FIG. 1, in some embodiments, separating the glass sheet from the continuous glass ribbon 170 may involve the glass engaging unit 160. The glass engaging unit 160 includes a body 162, an arm 164, a platform 166, and a plurality of gripping devices, such as suction devices 168. The arm 164 extends from the body 162. The platform 166 is positioned at a distal end of the arm 164. Suction devices 168 (e.g. suction cups and/or vacuum chucks) are arranged on the platform 166 and are configured to engage with edge portions of the "A" side of the glass ribbon. The arm 164 moves the platform 166 at a velocity vector Vra that matches the velocity vector Vr of the continuous glass ribbon 170 such that the continuous glass ribbon 170, the translatable separation initiation unit 150 (including the heating apparatus 154 and the flaw initiation device 156) and the platform 166 are all moving in tandem and there is no relative motion between them in the draw direction. In other words, the glass engaging unit 160 through the arm 164 causes the platform 166 to track with the continuous glass ribbon 170. When the platform 166 is tracking with the continuous glass ribbon 170 so that no relative motion in the draw direction between the platform and the glass ribbon is occurring, the arm 164 moves the platform 166 such that suction devices 168 engage with the glass ribbon below the desired line of separation. In some embodiments, the suction devices 168 may be spaced apart from the heating apparatus 154 by about 100 mm to about 200 mm, such as about 150 mm. Once the continuous glass ribbon 170 has been heated at the desired line of separation (and any flaws have been initiated in embodiments that initiate a flaw with the flaw initiation device 156 and/or the desired line of separation has been cooled with the cooling apparatus in embodiments that do so), the arm 164, now coupled to the continuous glass ribbon 170, imparts a bending moment to the continuous glass ribbon 170 about the desired line of separation to separate a glass sheet from the continuous glass ribbon 170. The arm 164 remains coupled to the separated glass sheet and moves it to a receiving station. The glass engaging unit 160 can, for example, deposit the glass sheet onto a conveyor assembly that moves the glass sheet for downstream processing (such as removal of the edge portions of the glass sheet, edge finishing, washing, etc.). Once the glass sheet has been deposited at the next process, the arm 164 is returned to a start position, prepared to separate and convey another glass sheet. In embodiments that heat the continuous glass ribbon 170 at the desired line of separation as described herein, the angle at which the glass engaging unit 160 must bend the continuous glass ribbon 170 to separate the glass sheet from the continuous glass ribbon 170 may be reduced, thereby mitigating post-separation motion imparted to the remainder of the continuous glass ribbon 170. In some embodiments, the method comprises bending the continuous glass ribbon at the desired line of separation to a bend angle less than or equal to about 20°, less than or equal to about 15°, in the range from about 10° to about 20°, or in the ranged from about 10° to about 15°. Such bend angle ranges may be smaller than the approximately 25° bend angle that may be required to separate a glass sheet from a continuous glass ribbon not heated along the desired line of separation as described herein. Such a smaller bend angle may desirably result in better stability of the continuous glass ribbon 170 and decreased movement of the ribbon in the +Y and −Y directions upon separation of a glass sheet from the continuous glass ribbon 170. In some embodiments, the glass engaging unit 160 may be configured as a robot, though embodiments are not limited thereto. In some embodiments, it may be desirable to separate the glass sheet from the continuous glass ribbon 170 within about 3-8 seconds from initially contacting the continuous glass ribbon 170 with the heating apparatus 154.

It should now be understood that the apparatuses and methods for heating moving continuous glass ribbons at desired lines of separation and/or for separating glass sheets from continuous glass ribbons produce glass sheets with enhanced edge quality, reduced vertical cracking, and reduced warping, as compared to glass sheets separated from continuous glass ribbons by conventional separation techniques.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An apparatus for processing glass, glass-ceramic or ceramic material, said apparatus comprising:
 a translatable support portion;
 a heating apparatus coupled to the translatable support portion and configured to contact a continuous glass ribbon across at least a portion of a width of the continuous glass ribbon at a desired line of separation as the translatable support portion moves in a draw direction, thereby preferentially applying heat to a first side of the continuous glass ribbon at the desired line of separation as the continuous glass ribbon moves in the draw direction; and
 a flaw initiation device configured to initiate a flaw in the continuous glass ribbon at the desired line of separation;
 wherein at least one of:
  a) the heating apparatus comprises a heating element and an insulating tube, and the heating element is disposed at least partially within the insulating tube and protrudes through an elongate aperture in the insulating tube, wherein the insulating tube is coupled to the translatable support portion by an element that traverses a body of the insulating tube; or b) the heating apparatus comprises a heating element and a thermally conductive cover, the heating element is disposed between the thermally conductive cover and the translatable support portion, and the thermally conductive cover comprises an apex configured to contact the continuous glass ribbon across the portion of the width of the continuous glass ribbon at the desired line of separation as the continuous glass ribbon moves in the draw direction, wherein an assembly of the heating element and the thermally conductive cover is secured to the translatable support portion via an insulator disposed between the heating element and the translatable support portion.

2. The apparatus of claim 1, wherein the heating apparatus and the flaw initiation device are arranged such that the continuous glass ribbon is disposed between the heating apparatus and the flaw initiation device when the heating apparatus contacts the continuous glass ribbon.

3. The apparatus of claim 1, wherein the heating apparatus comprises the heating element and the thermally conductive cover, the heating element is disposed between the thermally conductive cover and the translatable support portion, and the thermally conductive cover comprises the apex configured to contact the continuous glass ribbon across the portion of the width of the continuous glass ribbon at the desired line of separation as the continuous glass ribbon moves in the draw direction.

4. The apparatus of claim 3, wherein the apex of the thermally conductive cover comprises the flaw initiation device.

5. The apparatus of claim 3, wherein the thermally conductive cover is coupled to the translatable support portion.

6. The apparatus of claim 1, wherein the heating apparatus comprises the heating element and the insulating tube, and the heating element is disposed at least partially within the insulating tube and protrudes through the elongate aperture in the insulating tube.

7. The apparatus of claim 1, further comprising a counternosing, wherein the heating apparatus and the counternosing are arranged such that the heating apparatus is contactable with a first side of the continuous glass ribbon at the desired line of separation and the counternosing is contactable with a second side of the continuous glass ribbon at the desired line of separation.

8. The apparatus of claim 7, wherein the counternosing comprises the flaw initiation device.

9. The apparatus of claim 1, further comprising a cooling apparatus configured to contact the continuous glass ribbon across the portion of the width of the continuous glass ribbon at the desired line of separation as the continuous glass ribbon moves in the draw direction.

10. The apparatus of claim 9, wherein:
the heating apparatus is configured to contact the first side of the continuous glass ribbon; and
the cooling apparatus is configured to contact a second side of the continuous glass ribbon.

11. The apparatus of claim 1, further comprising:
a frame;
a carriage assembly movably coupled to the frame, the translatable support portion and the heating apparatus mounted on the carriage assembly; and
a drive mechanism coupled to the carriage assembly for moving the carriage assembly in the draw direction.

12. A method of separating a glass sheet from a continuous glass ribbon, the method comprising:
drawing molten glass in a draw direction at a speed S from a forming body to form the continuous glass ribbon, the continuous glass ribbon comprising a core layer disposed between a first cladding layer and a second cladding layer;
directing the continuous glass ribbon by a translatable separation initiation unit positioned downstream of the forming body, the translatable separation unit comprising:
a support portion;
a heating apparatus coupled to the support portion and configured to contact the continuous glass ribbon across at least a portion of a width of the continuous glass ribbon at a desired line of separation as the support portion moves in the draw direction, thereby preferentially applying heat to a first side of the continuous glass ribbon at the desired line of separation as the continuous glass ribbon moves in the draw direction, the heating apparatus comprising a heating element and an insulator disposed between the support portion and the heating element, the insulator comprising an insulating tube, the heating element disposed at least partially within the insulating tube and protruding through an elongate aperture in the insulating tube, wherein the insulating tube is coupled to the support portion by an element that traverses a body of the insulating tube;
moving the heating apparatus in the draw direction at the speed S;
applying heat preferentially to a first side of the continuous glass ribbon at a desired line of separation with the heating apparatus;
initiating a flaw in the continuous glass ribbon at the desired line of separation by scoring the core layer of the continuous glass ribbon without scoring either of the first cladding layer or the second cladding layer; and
separating the glass sheet from the continuous glass ribbon at the desired line of separation.

13. The method of claim 12, wherein:
an exposed portion of the core layer extends beyond the first cladding layer and the second cladding layer at an edge region of the continuous glass ribbon; and
scoring the core layer of the continuous glass ribbon without scoring either of the first cladding layer or the second cladding layer comprises scoring the exposed portion of the core layer.

14. The method of claim 12, wherein the core layer comprises an average coefficient of thermal expansion $CTE_{core}$ that is greater than an average coefficient of thermal expansion $CTE_{clad}$ of each of the first cladding layer and the second cladding layer.

15. The method of claim 12 wherein separating the glass sheet from the continuous glass ribbon at the desired line of separation comprises imparting a bending moment to the continuous glass ribbon about the desired line of separation.

16. The method of claim 12 further comprising cooling the continuous glass ribbon at the desired line of separation with a cooling apparatus.

17. A glass manufacturing apparatus comprising:
a forming body configured to form a continuous glass ribbon moving in a draw direction; and
a translatable separation initiation unit positioned downstream of the forming body, the translatable separation initiation unit comprising:
a support portion;

a heating apparatus coupled to the support portion and configured to contact the continuous glass ribbon across at least a portion of a width of the continuous glass ribbon at a desired line of separation as the support portion moves in the draw direction, thereby preferentially applying heat to a first side of the continuous glass ribbon at the desired line of separation as the continuous glass ribbon moves in the draw direction, the heating apparatus comprising a heating element and an insulator disposed between the support portion and the heating element, the insulator comprising an insulating tube, the heating element disposed at least partially within the insulating tube and protruding through an elongate aperture in the insulating tube, wherein the insulating tube is coupled to the support portion by an element that traverses a body of the insulating tube.

18. The glass manufacturing apparatus of claim 17, wherein the translatable separation initiation unit further comprises a scoring device configured to initiate a flaw in the continuous glass ribbon at the desired line of separation, the heating apparatus and the scoring device positioned such that the continuous glass ribbon is disposed between the heating apparatus and the scoring device when the heating apparatus contacts the continuous glass ribbon.

19. The glass manufacturing apparatus of claim 17, wherein:
the heating apparatus comprises a thermally conductive cover;
the heating element is coupled to the support portion;
the heating element is disposed between the thermally conductive cover and the support portion; and
the thermally conductive cover comprises an apex configured to contact the continuous glass ribbon across the portion of the width of the continuous glass ribbon at the desired line of separation as the continuous glass ribbon moves in the draw direction.

20. The glass manufacturing apparatus of claim 17, wherein the forming body comprises an upper isopipe and a lower isopipe to form the continuous glass ribbon comprising a core layer disposed between a first cladding layer and a second cladding layer.

21. The glass manufacturing apparatus of claim 17, wherein:
the translatable separation initiation unit further comprises a counternosing;
the heating apparatus is configured to contact the first side of the continuous glass ribbon at the desired line of separation;
the counternosing comprises the scoring device; and
the counternosing is configured to contact a second side of the continuous glass ribbon at the desired line of separation when the heating apparatus contacts the first side of the continuous glass ribbon at the desired line of separation.

* * * * *